(12) United States Patent
Watanabe et al.

(10) Patent No.: US 10,141,555 B2
(45) Date of Patent: Nov. 27, 2018

(54) MULTI-LAYERED POROUS FILM AND NONAQUEOUS-ELECTROLYTE SECONDARY BATTERY

(71) Applicant: Sumitomo Chemical Company, Limited, Tokyo (JP)

(72) Inventors: Koichiro Watanabe, Niihama (JP); Jian Wang, Daegu (KR); Yasutoshi Minemoto, Niihama (JP); Shinya Kimura, Kawasaki (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/519,191

(22) PCT Filed: Oct. 13, 2015

(86) PCT No.: PCT/JP2015/078951
§ 371 (c)(1),
(2) Date: Apr. 14, 2017

(87) PCT Pub. No.: WO2016/060130
PCT Pub. Date: Apr. 21, 2016

(65) Prior Publication Data
US 2017/0237056 A1     Aug. 17, 2017

(30) Foreign Application Priority Data

Oct. 15, 2014   (WO) .................. PCT/JP2014/077429
Apr. 15, 2015   (JP) .................................. 2015-083588

(51) Int. Cl.
*H01M 2/16*     (2006.01)
*B23B 27/20*    (2006.01)
(Continued)

(52) U.S. Cl.
CPC ................. *H01M 2/16* (2013.01); *B32B 3/26* (2013.01); *B32B 3/266* (2013.01); *B32B 5/22* (2013.01);
(Continued)

(58) Field of Classification Search
CPC ............... H01M 2/16; H01M 10/0565; H01M 10/0566; H01M 2300/0017; B32B 27/20; B32B 5/22; B32B 2457/10
See application file for complete search history.

(56) References Cited

U.S. PATENT DOCUMENTS 5,669,988 A    9/1997   Takenaka et al.
6,723,467 B2   4/2004   Yoshida et al.
(Continued)

FOREIGN PATENT DOCUMENTS

CN   103718338 A   4/2014
CN   103781861 A   5/2014
(Continued)

OTHER PUBLICATIONS

English Machine Translation of JP2006-307163 to Okada, Nov. 2006 (Year: 2006).*
(Continued)

*Primary Examiner* — Lisa S Park
(74) *Attorney, Agent, or Firm* — Panitch Schwarze Belisario & Nadel LLP

(57) ABSTRACT

Provided is a multi-layered porous film which includes a functional layer having a controlled thickness in a lengthwise direction thereof and which is suitable as a separator for batteries. The multi-layered porous film includes a base film, and a functional layer containing both an inorganic filler and a binder resin, the functional layer being formed on the base film, wherein a difference between a maximum basis weight and a minimum basis weight of the multi-layered porous
(Continued)

film in a length-wise direction thereof is equal to or smaller than 2 grams/m², the basis weight being measured every 100 meters interval. The separator fabricated by cutting a film roll comprised of a multi-layered porous film into pieces each having a given length has small lot-based fluctuation in quality, and makes it possible to fabricate a battery having a small fluctuation in quality.

8 Claims, 2 Drawing Sheets

(51) Int. Cl.
    *B23B 5/22*     (2006.01)
    *B32B 5/22*     (2006.01)
    *B32B 27/18*     (2006.01)
    *H01M 10/0566*     (2010.01)
    *B32B 27/20*     (2006.01)
    *H01M 10/0565*     (2010.01)
    *B32B 27/08*     (2006.01)
    *B32B 27/22*     (2006.01)
    *B32B 27/32*     (2006.01)
    *B32B 3/26*     (2006.01)
    *H01M 2/14*     (2006.01)
    *H01M 10/052*     (2010.01)

(52) U.S. Cl.
CPC .............. *B32B 27/08* (2013.01); *B32B 27/18* (2013.01); *B32B 27/20* (2013.01); *B32B 27/22* (2013.01); *B32B 27/32* (2013.01); *H01M 2/145* (2013.01); *H01M 2/1686* (2013.01); *H01M 10/0565* (2013.01); *H01M 10/0566* (2013.01); *B32B 2250/03* (2013.01); *B32B 2250/242* (2013.01); *B32B 2250/40* (2013.01); *B32B 2255/10* (2013.01); *B32B 2255/20* (2013.01); *B32B 2255/26* (2013.01); *B32B 2264/104* (2013.01); *B32B 2307/206* (2013.01); *B32B 2307/718* (2013.01); *B32B 2307/724* (2013.01); *B32B 2307/726* (2013.01); *B32B 2307/732* (2013.01); *B32B 2457/10* (2013.01); *H01M 10/052* (2013.01); *H01M 2300/0017* (2013.01)

(56) References Cited

U.S. PATENT DOCUMENTS

| | | | |
|---|---|---|---|
| 8,597,816 B2 | 12/2013 | Nishikawa et al. | |
| 2002/0053123 A1 | 5/2002 | Sanda et al. | |
| 2003/0017386 A1* | 1/2003 | Daido ..................... | H01M 2/14 429/142 |
| 2006/0199294 A1* | 9/2006 | Fujikawa ................ | H01M 2/16 438/42 |
| 2010/0173187 A1 | 7/2010 | Nishikawa et al. | |
| 2011/0171514 A1 | 7/2011 | Nishikawa et al. | |
| 2012/0301605 A1 | 11/2012 | Kim et al. | |
| 2012/0321929 A1 | 12/2012 | Nishikawa et al. | |
| 2013/0011716 A1* | 1/2013 | Sano ....................... | B32B 23/08 429/145 |
| 2014/0178741 A1 | 6/2014 | Hasegawa et al. | |
| 2014/0242444 A1 | 8/2014 | Nishikawa et al. | |
| 2014/0302389 A1 | 10/2014 | Hasegawa et al. | |
| 2014/0329154 A1 | 11/2014 | Shinoda et al. | |

FOREIGN PATENT DOCUMENTS

| | | |
|---|---|---|
| CN | 103891002 A | 6/2014 |
| CN | 103946023 A | 7/2014 |
| JP | H07907 A | 1/1995 |
| JP | H0860250 A | 3/1996 |
| JP | H103898 A | 1/1998 |
| JP | H1111760 A | 1/1999 |
| JP | 2002192061 A | 7/2002 |
| JP | 2004227972 A | 8/2004 |
| JP | 2004344759 A | 12/2004 |
| JP | 3756815 B2 | 3/2006 |
| JP | 2006307163 A | 11/2006 |
| JP | 2007000730 A | 1/2007 |
| JP | 2007234518 A | 9/2007 |
| JP | 2010232048 A | 10/2010 |
| JP | 2010264398 A | 11/2010 |
| JP | 2011194381 A | 10/2011 |
| JP | 2013125876 A | 6/2013 |
| JP | 2014205126 A | 10/2014 |
| WO | 2008156033 A1 | 12/2008 |
| WO | 2013073362 A1 | 5/2013 |

OTHER PUBLICATIONS

English Machine Translation of JP2004-344759 to Saito, Dec. 2004 (Year: 2004).*
Machine translation of Saito JP2004344759 (previously cited) (Year: 2004).*
Li et al. Cellulose (2013) 20: 3219 (Year: 2013).*
International Search Report dated Jan. 13, 2015 in International Application No. PCT/JP2014/077429.
Office Action dated Aug. 4, 2015 in JP Application No. 2015525325.
Office Action dated Jan. 5, 2016 in JP Application No. 2015525325.
Notice of Reasons for Refusal dated May 31, 2016 in JP Application No. 2015-083588.
Int'l Search Report dated Nov. 24, 2015 in Int'l Application No. PCT/JP2015/078951.
Written Opinion dated Nov. 24, 2015 in Int'l Application No. PCT/JP2015/078951.
Office Action dated Mar. 28, 2017 in CN Application No. 2014800376963.
Office Action dated Dec. 18, 2017 in U.S. Appl. No. 14/888,115, by Watanabe.
Office Action dated Sep. 27, 2017 in CN Application No. 201580055830.7.
Office Action dated Apr. 25, 2018 in CN Application No. 201580055830.7.

* cited by examiner

MULTI-LAYERED POROUS FILM AND NONAQUEOUS-ELECTROLYTE SECONDARY BATTERY

CROSS-REFERENCE TO RELATED APPLICATION

The present application is based on International Application No. PCT/JP2015/078951 which was filed on Oct. 13, 2015 and claims priority under 35 U.S.C. § 119 from PCT/JP2014/077429 filed on Oct. 15, 2014, and Japanese Patent Application No. 2015-083588 filed on Apr. 15, 2015.

BACKGROUND OF THE INVENTION

Field of the Invention

The present invention relates to a multi-layered porous film, in particular, to a multi-layered porous film suitable to a battery, in particular, suitable to a separator to be used for a nonaqueous-electrolyte secondary battery.

Background Art

Since a nonaqueous-electrolyte secondary battery such as a lithium secondary battery has a high energy density, a nonaqueous-electrolyte battery is broadly employed as a battery to be used in a personal computer, a cellular phone, and a mobile data terminal.

A nonaqueous-electrolyte secondary battery usually has a structure including a winding core, and an outer case in which the winding core is housed, the winding core being comprised of wound four layers including an anode sheet, a separator, a cathode sheet, and a separator. Since the outer case is designed to have a fixed size, if a separator is thick, the battery components such as an anode, a cathode and a separator are housed in the outer case in a much compressed condition. Each of the battery components has a lot of micro pores through which electrolyte passes. If the battery components are much compressed, the micro pores of the battery components (in particular, the micro pores of the separator) are collapsed with the result that an amount of electrolyte to be absorbed into the micro pores is reduced, and accordingly, an adequate amount of electrolyte cannot be supplied to each of the battery components. Furthermore, it takes time for electrolyte after being introduced into a case until penetrating the battery components in the fabrication of a battery, resulting in reduction in productivity of a nonaqueous-electrolyte secondary battery. On the other hand, if a separator is thin, adhesion among an anode, a cathode and a separator is reduced, resulting in that a contact resistance between the battery components is increased, and that electrolyte is in short, because a space is generated in a battery case more than expected.

Furthermore, since a nonaqueous-electrolyte secondary battery has a high energy density, if a nonaqueous-electrolyte secondary battery is damaged or if a device housing a nonaqueous-electrolyte secondary battery therein is damaged to thereby cause internal short-circuit or external short-circuit, a large amount of current runs through a nonaqueous-electrolyte secondary battery, resulting with much generation of heat therein. Accordingly, a nonaqueous-electrolyte secondary battery is required to prevent an amount of heat greater than a predetermined amount from being generated, and further, to keep high security.

In order to keep security, a nonaqueous-electrolyte secondary battery is generally designed to have shut-down function in which passage of ions between an anode and a cathode is interrupted by means of a separator in the case of abnormal heat generation, to thereby avoid further heat generation. As a separator is used a porous film mainly composed of polyolefin fusible in the case of abnormal heat generation. Since the porous film is fused and pores of the porous film are clogged in a battery employing the separator when abnormal heat generation occurs, ions are interrupted to pass through the pores of the porous film to thereby prevent further heat generation. However, in some cases, a separator comprised of a porous film composed of polyolefin may shrink or a porous film may be broken, and accordingly, an anode and a cathode may make direct contact with each other to thereby cause short-circuit. A separator comprised of a porous film composed of polyolefin cannot adequately keep a shape, and sometimes is not able to suppress abnormal heat generation caused by short-circuit.

There may be formed a layer (hereinafter, referred to as "a functional layer") providing an additional function to the above-mentioned porous film (hereinafter, referred to as "a base film"). For instance, a thermally resistant layer composed of a thermo-resistant material may be formed as a functional layer on a surface of the base film to thereby apply shape-stability to a separator such that the separator keep its shape even in a high temperature environment. As a multi-layered porous film including such a functional layer as mentioned above, there has been suggested a multi-layered porous film on which a functional layer is formed, to be fabricated by coating a coating liquid containing an inorganic filler and a binder resin onto a surface of a base film to thereby form a coating film, and removing solvent from the coating film (see the patent documents 1 to 3).

Apart from the above-mentioned thermally resistant layer, a functional layer may be comprised of an adhesive layer or an electrolyte-retaining layer. A composition and/or a thickness of a functional layer are determined in dependence on a required function.

The above-mentioned functional layer in the multi-layered porous film is fabricated by coating a coating liquid containing both an inorganic filler and a binder resin onto a surface of a base film. A preferable example of a process of coating a coating liquid onto a base film is a gravure coating process. A gravure coating process is particularly suitable to industrial fabrication of a large-sized separator.

A gravure coating process generally includes steps of soaking a gravure roll having protrusions and recesses formed on a surface thereof, into a coating liquid to thereby retain the coating liquid in the recesses formed on a surface of the gravure roll, and causing the gravure roll to make contact with a continuously fed base film to thereby uniformly coat the coating liquid retained in the recesses, onto a surface of the base film.

A gravure roll to be used for a gravure coating process is designed to have various patterns of protrusions and recesses to be formed on a surface thereof, and a depth of recesses in accordance with a desired coating pattern and/or a coating volume for various purposes.

PRIOR ART DOCUMENTS

Patent Documents

Patent document 1: Japanese patent No. 3756815
Patent document 2: Japanese Patent Application Publication No. H10 (1998)-3898
Patent document 3: Patent Application Publication No. 2004-227972

DISCLOSURE OF THE INVENTION

Problems to be Solved by the Invention

As mentioned above, a conventional multi-layered porous film comprises a base film such as a porous film composed of polyolefin, and a functional film, such as a thermally resistant layer and an adhesive layer, formed on the base film. The conventional multi-layered porous film is accompanied with a problem that a thickness of the functional film in a length-wise direction thereof cannot be adequately controlled. If the functional film has a non-uniform basis weight in a length-wise direction thereof, a pressure non-uniformly acts on a multi-layered porous film when the multi-layered porous film is wound, resulting in that pores of the multi-layered porous film may be locally collapsed.

Furthermore, in the case that a lengthy multi-layered porous film is used as a separator in a battery, separators are fabricated by cutting a film roll comprised of a multi-layered porous film into pieces each having a given length, and then, there is fabricated a plurality of batteries each including the thus fabricated separator. If a multi-layered porous film in a film roll has a non-uniform thickness in a length-wise direction, the resultant batteries have separators having thicknesses different from one another, resulting in fluctuations in quality of the resultant batteries.

Though a gravure coating process is suitable to industrial coating of a coating liquid onto a separator having a large area, in the case that a gravure coating process includes a step of coating a coating liquid containing therein hard inorganic fillers such as silica particles and alumina particles, onto a surface of a porous polyolefin film, a gravure coating process is accompanied with the problem, due to the following causes (1) and (2), that a volume of the coating liquid retained in a recess of a gravure roll varies with the passage of time, and accordingly, it is not possible to stably and uniformly coat the coating liquid onto a surface of a porous film in a length-wise direction thereof.

(1) A gravure roll is abraded at a surface thereof by hard inorganic fillers such as silica particles and alumina particles during a gravure coating process. That is, there occurs "roll abrasion", resulting in that impurities derived from an underlying metal of a gravure roll are mixed into a separator. The roll abrasion occurs in particular at summits of protrusions formed on a surface of a gravure roll, through which the gravure roll makes direct contact with a base film.

(2) Inorganic fillers are aggregated on and stick to a surface of a gravure roll, resulting in that recesses formed on a surface of a gravure roll are clogged with the lapse of time while the gravure roll is coating a coating liquid onto a surface of a base film.

In view of the problems mentioned above, it is an object of the present invention to provide a multi-layered porous film including a base film, and a functional layer containing both an inorganic filler and a binder resin, formed on the base film, the functional layer having a controlled thickness in a length-wise direction thereof.

Solution to the Problems

The prevention invention provides the followings.

[1] A multi-layered porous film including a base film, and a functional layer containing both an inorganic filler and a binder resin, the functional layer being formed on the base film, wherein a difference between a maximum basis weight and a minimum basis weight of the multi-layered porous film in a length-wise direction thereof is equal to or smaller than 2 grams/m$^2$, the basis weight being measured every 100 meters interval.

[2] The multi-layered porous film as set forth in [1], wherein a difference between a maximum thickness and a minimum thickness of the multi-layered porous film in a length-wise direction thereof is equal to or smaller than 1.5 micrometers, the thickness being measured every 100 meters interval.

[3] The multi-layered porous film as set forth in [1] or [2], wherein the functional layer is comprised of a thermally resistant layer.

[4] The multi-layered porous film as set forth in any one of [1] to [3], wherein the inorganic filler has Mohs hardness equal to or greater than four.

[5] The multi-layered porous film as set forth in [4], wherein the inorganic filler is comprised of an alumina filler.

[6] The multi-layered porous film as set forth in any one of [1] to [5], wherein the binder resin is comprised of water-dispersible polymer.

[7] The multi-layered porous film as set forth in any one of [1] to [5], wherein the binder resin is comprised of water-soluble polymer.

[8] The multi-layered porous film as set forth in any one of [1] to [7], wherein a weight ratio of the inorganic filler relative to the binder resin is in the range of 1 to 100 both inclusive.

[9] A separator comprised of the multi-layered porous film as set forth in any one of [1] to [8].

[10] A nonaqueous-electrolyte secondary battery including a separator comprised of the multi-layered porous film as set forth in any one of [1] to [8].

Advantages Provided by the Invention

Since the multi-layered porous film in accordance with the present invention is superior in uniformity in a thickness of the functional layer in a length-wise direction thereof, a battery including a separator comprised of the multi-layered porous film can have stable quality.

The above and other objects and advantageous features of the present invention will be made apparent from the following description made with reference to the accompanying drawings, in which like reference characters designate the same or similar parts throughout the drawings.

Figure 1:
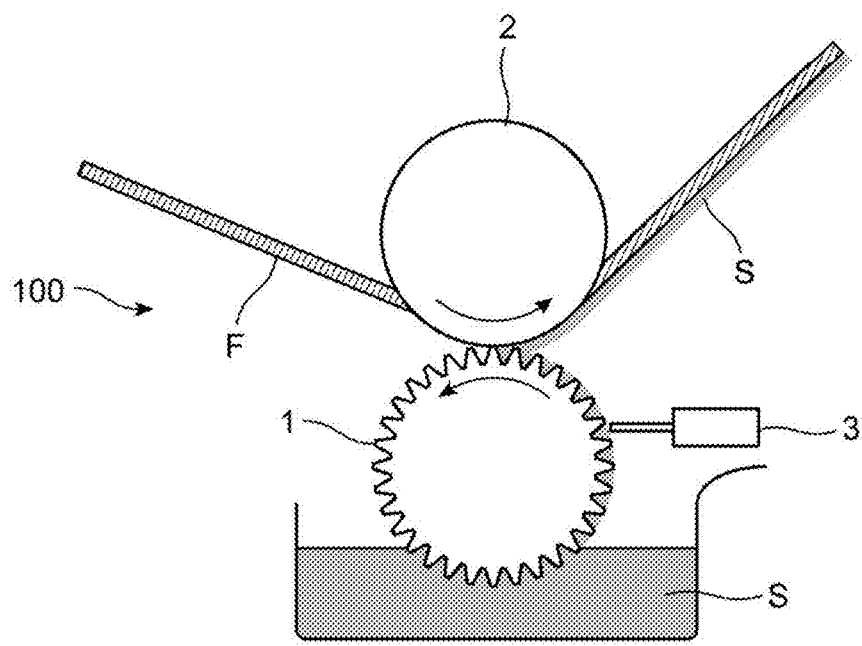
FIG. 1 illustrates primary parts of an apparatus for carrying out a gravure coating process, in accordance with an embodiment of the present invention.

INDICATION BY REFERENCE NUMERALS 1, 1' Gravure roll
2 Back up roll

3 Doctor blade
10 Roll body
11 DLC layer
12 Intermediate layer
20 Obliquely extending protrusion
20a Summit of the protrusion
30 Obliquely extending recess
30a Bottom of the recess
100 Apparatus for carrying out a gravure coating process
S Coating liquid
F Base film
T Distance between summits of the obliquely extending protrusions situated adjacent to each other
H Height of the obliquely extending recess
W Width of the summit of the protrusion
W' Width of the bottom of the obliquely extending recess Embodiment for Reducing the Invention to Practice The present invention is explained hereinbelow in detail with reference to examples. It is to be understood that the subject matter encompassed by way of the present invention is not to be limited to those specific example, but the subject matter of the invention includes all alternatives, modifications and equivalents as can be included within the spirit and scope of the present invention. In the specification, the words "range between A and B" mean that A and B are both inclusive in the range.

[Multi-Layered Porous Film]

The multi-layered porous film in accordance with the present invention includes a base film, and a functional layer containing both an inorganic filler and a binder resin, the functional layer being formed on the base film, wherein a difference between a maximum basis weight and a minimum basis weight of the multi-layered porous film in a length-wise direction thereof is equal to or smaller than 2 grams/$m^2$, the basis weight being measured every 100 meters interval. The difference between a maximum basis weight and a minimum basis weight is preferably equal to or smaller than 1.6 grams/$m^2$, more preferably equal to or smaller than 1.3 grams/$m^2$, particularly preferably equal to or smaller than 1 grams/$m^2$, and most preferably equal to or smaller than 0.5 grams/$m^2$. A separator fabricated with the multi-layered porous film having the smaller difference is able to have more uniform quality, ensuring the smaller fluctuation in quality of resultant batteries.

How a basis weight of the multi-layered porous film (separator) is measured is explained in the embodiments described hereinbelow.

The base film (hereinafter, sometimes referred to as "a layer A") is comprised of a porous film having micro pores leading to the inside of the porous film. Gas and liquid can pass through the base film from one of surfaces of the base film to the other surface.

Since the layer A has a character that it is molten in a high temperature environment, and accordingly, the pores are clogged, in the case that the multi-layered porous film is used as a separator, the multi-layered porous film can have shut-down function by which the multi-layered porous film is molten and thus the pores are clogged in the case that a battery abnormally generates heat.

The functional film (hereinafter, sometimes referred to as "a layer B") acts as a layer to be formed on the base film in order to provide an additional function to the base film. The functional film may be comprised of an adhesive layer, a layer retaining electrolyte, or a thermally resistant layer, and so on.

The layers A and B are explained hereinbelow in detail.

The multi-layered porous film is designed to have a structure in which the layer B is formed on one of surfaces or both of surfaces of the layer A. The structure in which the layer B is formed on one of surfaces of the layer A is preferable in that steps of forming the layer B on a surface of the layer A can be simplified, and the structure in which the layer B is formed on both of surfaces of the layer A is preferable in that a resultant multi-layered porous film is unlikely to curl, ensuring preferred handling.

The multi-layered porous film is designed to have a length generally in the range of 200 meters to 10000 meters both inclusive, preferably in the range of 500 meters to 5000 meters both inclusive, and more preferably in the range of 1000 meters to 3000 meters both inclusive. The multi-layered porous film having such a length can be cut into pieces to thereby use as a component (a separator) of a battery.

When used as a separator, the multi-layered porous film is designed to have a length to be determined in dependence on a type or a size of a battery. For instance, 18650 cylindrical lithium secondary battery, which is a general nonaqueous-electrolyte secondary battery, generally has a length in the range of about 0.5 meters to about 1.5 meters both inclusive.

The multi-layered porous film is designed to have a total thickness (a thickness of the layers A and B) generally in the range of 9 micrometers to 80 micrometers both inclusive, preferably in the range of 10 micrometers to 50 micrometers both inclusive, and more preferably in the range of 12 micrometers to 35 micrometers both inclusive. If the multi-layered porous film has a greater thickness, a battery including the multi-layered porous film as a separator is likely to have a smaller electric capacity.

In the multi-layered porous film in accordance with the present invention, a difference between a maximum thickness and a minimum thickness of the multi-layered porous film in a length-wise direction thereof is preferably equal to or smaller than 1.5 micrometers, the thickness being measured every 100 meters interval, more preferably equal to or smaller than 1.0 micrometers. A separator fabricated with the multi-layered porous film having the smaller difference is able to have more uniform quality, ensuring the smaller fluctuation in quality of resultant batteries. The uniform thickness ensures the advantage that when the multi-layered porous film is wound, the multi-layered porous film is not likely to be locally collapsed, because a pressure uniformly acts on a surface of the separator.

A thickness of the multi-layered porous film is measured in accordance with Japanese Industrial Standards (K7130-1999).

The multi-layered porous film has a porosity generally in the range of 30 to 85 volume percentage both inclusive, and preferably in the range of 35 to 80 volume percentage both inclusive.

Furthermore, the multi-layered porous film has gas permeability preferably in the range of 50 to 2000 seconds/100 cc in the expression of Gurley number, and more preferably in the range of 50 to 1000 seconds/100 cc.

A battery including the multi-layered porous film having porosity in the above-mentioned range, as a separator, is able to have an adequate ion-permeability, and thus, have a high load performance as a battery.

A smaller shape-maintenance rate of the multi-layered porous film among the shape-maintenance rate to be measured in a MD direction and the shape-maintenance rate to be measured in a TD direction is preferably equal to or greater than 95%, and more preferably equal to or greater than 97%, wherein the shape-maintenance rate is defined as a rate with which the multi-layered porous film is able to maintain its shape at a high temperature at which the shut-down occurs. Herein, the MD direction is defined as a length-wise direction of the fabricated sheet, and the TD direction is defined as a width-wise direction of the fabricated sheet. The high temperature at which the shut-down occurs is in the range of 80 degrees centigrade to 180 degrees centigrade both inclusive, and generally in the range of about 130 degrees centigrade to about 150 degrees centigrade both inclusive.

The multi-layered porous film may be designed to include a single or a plurality of base film(s), and a single or a plurality of functional layer(s). In the case that the multi-layered porous film includes a plurality of functional layers, each of the functional layers may be designed to have functions different from one another. Furthermore, the multi-layered porous film may be designed to include a porous layer apart from the base film and the functional layer as long as the object of the present invention is not much suffered. For instance, the multi-layered porous film may include an adhesive film or a protective film both including no inorganic fillers.

Physical properties of the base film (the layer A) and the functional layer (the layer B) both being a component of the multi-layered porous film, and a method of fabricating the multi-layered porous film are explained hereinbelow in detail.

[Base Film (Layer A)]

The layer A is comprised of a porous film having micro pores leading to the inside of the porous film. Gas and liquid can pass through the layer A from one of surfaces of the layer A to the other surface. The layer A acts as a substrate of the multi-layered porous film. The layer A may be comprised preferably of a porous film containing polyolefin as a main constituent.

The layer A has to contain polyolefin at a ratio equal to or greater than 50 weight percent relative to a total weight of the layer A. It is preferable that the layer A contains polyolefin at a ratio equal to or greater than 90 weight percent relative to a total weight of the layer A, and more preferable that the layer A contains polyolefin at a ratio equal to or greater than 95 weight percent relative to a total weight of the layer A.

It is preferable that polyolefin contained in the layer A contains a component having a high molecular weight, specifically, a component having a weight-average molecular weight in the range of $5 \times 10^5$ to $15 \times 10^6$ both inclusive. It is preferable that the layer A contains polyolefin having a weight-average molecular weight equal to or greater than 1,000,000, because the layer A and accordingly the multi-layered porous film including the layer A can have at entirety an increased intensity.

As polyolefin, there may be selected homopolymer or copolymer made by polymerizing olefin such as ethylene, propylene, 1-butylene, 4-methyl-1-pentene, and 1-hexene. Among them, polyethylene made by homo-polymerizing ethylene is preferably used, and polyethylene having a high molecular weight, specifically, a weight-average molecular weight equal to or greater than 1,000,000 is preferably used. As an alternative, polypropylene made by homo-polymerizing propylene is preferably used as polyolefin.

The layer A has gas permeability generally in the range of 30 to 500 seconds/100 cc in the expression of Gurley number, and more preferably in the range of 50 to 300 seconds/100 cc.

A separator including the layer A having gas permeability in the above-mentioned range is able to have an adequate ion-permeability.

The layer A has a porosity preferably in the range of 20 to 85 volume percentage both inclusive, and more preferably in the range of 30 to 75 volume percentage both inclusive, because the layer A having a porosity in these ranges can enhance an amount of electrolyte which the layer A can retain therein, and is surely able to have the shut-down function.

The layer A has pores each having a diameter preferably equal to or smaller than 3 micrometers, and more preferably equal to or smaller than 1 micrometer, because the diameter provides adequate ion-permeability to the multi-layered porous film used as a separator in a battery, and further, the diameter prevents particles from penetrating an anode and a cathode.

The layer A may have any thickness, if the thickness provides electrical insulation caused by the shut-down. The thickness is generally in the range of 8 micrometers to 50 micrometers both inclusive, and preferably in the range of 10 micrometers to 30 micrometers both inclusive, taking account of the shut-down performance of a resultant secondary battery and a capacity balance.

The thickness of the layer A means a thickness of the layer A as a base material of which the multi-layered porous film is fabricated, and is to be measured in accordance with JIS (K7130-1999).

The layer A has a basis weight generally in the range of 4 $g/m^2$ to 20 $g/m^2$ both inclusive, and preferably in the range of 5 $g/m^2$ to 12 $g/m^2$ both inclusive, because the range increases a strength, a film thickness, handling property, and a weight of the multi-layered porous film, and further, increases a weight energy density and a volume energy density of the multi-layered porous film used as a separator of a battery.

It is preferable that the layer A contains polyolefin as a main constituent. The layer A may be designed to have a single-layered structure or a multi-layered structure. For instance, the multi-layered structure includes a first polyolefin layer containing a certain polyolefin as a main constituent, and a second polyolefin layer containing as a main constituent a polyolefin different from the polyolefin of the first polyolefin layer, and laminated on at least one of surfaces of the first polyolefin layer. It is preferable that the multi-layered structure includes a polyethylene layer containing polyethylene as a main constituent, and polypropylene layers each containing polypropylene as a main constituent, laminated on opposite surface of the polyethylene layer (polypropylene layer/polyethylene layer/polypropylene layer).

A method of fabricating the layer A is not to be limited to a specific method. For instance, the layer A can be fabricated by the method disclosed in Japanese Patent Application Publication No. H7 (1995)-29563, including the steps of adding plasticizing agent into thermoplastic resin to thereby form a film, and removing the plasticizing agent by means of a solvent, or by the method disclosed in Japanese Patent Application Publication No. H7 (1995)-304110, including the steps of preparing a film fabricated in accordance with a conventional process and composed of thermoplastic resin, and selectively extending structurally weak amorphous portions of the film to thereby form micro pores in the film.

For instance, in the case that the layer A is composed of polyolefin resin containing therein both polyethylene having a super-high molecule weight, and polyolefin having a low molecule weight, specifically, polyolefin having a weight-average molecular weight equal to or smaller than 10,000, it is preferable that the layer A is fabricated by the steps identified below, from the point of view of fabrication costs.

(1) the step of mixing 100 parts by weight of polyethylene having a super-high molecular weight, 5 to 200 parts by weight of polyolefin having a low molecular weight, specifically, a weight-average molecular weight equal to or smaller than 10,000, and 100 to 400 parts by weight of inorganic filler such as calcium carbonate to one another to thereby fabricate a polyolefin resin composition (2) the step of forming a sheet from the polyolefin resin composition (3) the step of removing inorganic filler out of the sheet formed in the step (2)

(4) the step of extending the sheet resulting from the step (3) to thereby fabricate the layer A It is possible to control a porosity of the layer A by varying conditions in the step (4) such as a speed at which the sheet is extended, a temperature at which the sheet is extended and/or a temperature at which the sheet is thermally fixed. Furthermore, the layer A may be a commercially available one. It is preferable that the layer A has the above-mentioned properties.

[Functional Layer (Layer B)]

The layer B is formed on a surface of the base film to provide an additional function to the base film. The functional layer may be an adhesive layer through which the base film is adhered to another layer, an electrolyte-retaining layer enhancing an ability of a separator to retain electrolyte therein, a thermally resistant layer providing a separator with an ability of maintaining its shape even at a high temperature, and so on. A type and a particle diameter of an inorganic filler to be contained in the layer B, a type of a binder resin, a mixture ratio of an inorganic filler and a binder resin, and so on, are determined in dependence on a purpose of using the layer B. In a preferred embodiment, the functional layer is designed to be a thermally resistant layer, because safety can be enhanced in a battery including a separator comprised of the multi-layered porous film when the battery abnormally generates heat.

A filler to be contained in the layer B is required to have a hardness equal to or greater than a predetermined hardness in order to prevent the filler from being deformed and/or collapsed by an external force caused by contraction of a battery in the case that the layer B is used as a separator of the battery. Furthermore, the layer B is required to have a heat resistance, in the case that the layer B is designed to be a thermally resistant layer, in order to keep an anode and a cathode electrically insulated from each other even after the base film (the layer A) has been molten. As a material satisfying the above-mentioned requirements, an inorganic filler is used as a filler to be contained in the layer B.

The inorganic filler has Mohs hardness preferably equal to or greater than four, more preferably equal to or greater than five, further preferably equal to or greater than six, and most preferably equal to or greater than seven. As the inorganic filler having the above-mentioned Mohs hardness, there may be selected fluorite (Mohs hardness: 4), barium titanate (4.5), phosphate (5), glass (5), orthoclase (6), burning kaolin (6), magnesia (6.5), silica (7), zirconia (7), titania (7.5), or alumina (9). These fillers may be used alone or in combination of two or more. Fillers having Mohs hardness smaller than four may be mixed with fillers having Mohs hardness equal to or greater than four.

It is preferable that inorganic oxide is used as the inorganic filler from the standpoint of thermal resistance and scientific stability. Specifically, it is preferable to use silica, zirconia, titania or alumina, and it is more preferable to use alumina. These inorganic fillers may be used alone or in combination of two or more.

The inorganic filler has an average particle diameter preferably equal to or smaller than 3 micrometers, and more preferably equal to or greater than 1 micrometer. The inorganic filler is in the form of a ball or a gourd. An average particle diameter of the inorganic filler may be measured by a method including the steps of arbitrarily selecting every 25 particles, measuring a particle diameter of each of the particles by means of a scanning electron microscope (SEM), and calculating a diameter average of 10 particles, or a method including the steps of measuring a BET specific surface area, and carrying out spherical approximation to the BET specific surface area to thereby calculate a diameter average. If the inorganic filler is not spherical in the measurement of a diameter average by means of SEM, a length in a direction in which a particle has a maximum length is regarded as a diameter.

Two or more types of inorganic fillers having diameters and/or specific surface areas different from each other may be mixed with one another.

A binder resin used for formation of the layer B has a function of bonding the inorganic fillers comprising the layer B to each other, and bonding the inorganic filler and the base film to each other. The binder resin is comprised preferably of a resin soluble or dispersible in a solvent used in a coating liquid, but insoluble in electrolyte of a battery, and further electrochemically stable in a range in which the battery is actually used. It is preferable to use water-dispersible polymer or water-soluble polymer as the binder resin, because a solvent of a coating liquid may be comprised of an aqueous solvent from the standpoint of a process and an environmental load. Herein, "an aqueous solvent" means a solvent containing water at 50 or more weight percentage, and further containing other solvents such as ethanol and/or additives as long as dispersibility of the water-dispersible polymer and solubility of the water-soluble polymer are not degraded.

As the water-dispersible polymer, there may be selected polyolefin such as polyethylene and polypropylene, fluorine-containing resin such as polyvinylidene fluoride and polytetrafluoroethylene, fluorine-containing rubber such as vinylidene fluoride-hexafluoropropylene-tetrafluoroethylene copolymer and ethylene-tetrafluoroethylene copolymer, rubber such as styrene-butadiene copolymer and hydrogenated copolymer thereof, acrylic acid ester copolymer, methacrylic acid ester copolymer, acrylonitrile-acrylic acid ester copolymer, styrene-acrylic acid ester copolymer, ethylene propylene rubber, and polyvinyl acetate, or a resin having a fusing point or a glass transition temperature equal to or higher than 180 degrees centigrade, such as polyphenylene ether, polysulfone, polyethersulfone, polyp henylenesulfide, polyetherimide, polyamideimide, polyetheramide, polyamide, and polyester.

Acrylic resin such as acrylic acid ester copolymer, methacrylic acid ester copolymer, acrylonitrile-acrylic acid ester copolymer, and styrene-acrylic acid ester copolymer preferably provides adhesion between a filler and a filler or between a filler and the base film.

A resin having a fusing point or a glass transition temperature equal to or higher than 180 degrees centigrade, such as polyphenylene ether, polysulfone, polyethersulfone, p olyphenylenesulfide, polyetherimide, polyamideimide, polyetheramide, polyamide, and polyester is preferably used, because they have a thermally high resistance, and accordingly, enhance a rate at which the multi-layered porous film maintains its shape in a high temperature environment. Among thermally resistant resins, it is preferable to use polyetherimide, polyamideimide, polyetheramide, or polyamide, and it is more preferable to use polyamide.

As the water-soluble polymer, there may be selected polyvinyl alcohol, polyethylene glycol, cellulose ether, sodium alginate, polyacrylic acid, polyacrylic amide, or polymethacrylic acid. Among water-soluble polymers, cellulose ether is preferably used. As cellulose ether, there may be selected carboxymethyl cellulose (CMC), hydroxyethyl cellulose (HEC), carboxyethyl cellulose, methyl cellulose, ethyl cellulose, cyanoethyl cellulose, or oxyethyl cellulose. It is particularly preferable to use CMC or HEC, because they are chemically stable. Furthermore, if there exist salts of the water-soluble polymer, the salts are contained within a range of the water-soluble polymer.

When a nonaqueous solvent is to be used, there may be selected a fluorine-containing resin such as polyvinylidene fluoride, polyvinylidene chloride, or polyacrylonitrile.

Furthermore, those binder resins may be used alone or, if necessary, in combination of two or more.

As mentioned above, a ratio in the layer B between the inorganic filler and the binder resin is determined in dependence on an intended use of the layer B. A weight ratio of the inorganic filler relative to the binder resin is preferably in the range of 1 to 100 both inclusive, and more preferably in the range of 2 to 99 both inclusive. In the case that the layer B is comprised of a thermally resistant layer, the weight ratio is preferably in the range of 4 to 99 both inclusive.

The layer B is designed to have such a thickness that ion-permeability is not deteriorated and the functions of the layer B are not degraded. A range in which the functions of the layer B are not degraded indicates, in the case that the layer B is comprised of a thermally resistant layer, for instance, a range in which the layer B is able to maintain both a thermal resistance against a high temperature and a function of stably keeping a shape of the layer B.

If the layer B is too thick, a load performance of a battery including a separator comprised of the layer B is afraid to be deteriorated, and on the contrary, if the layer B is too thin, the layer B cannot adequately have functions required to the layer B. For instance, in the case that the layer B is comprised of a thermally resistant layer, it is afraid that a separator of a battery may be shrunk due to thermal shrinkage of a porous film composed of polyolefin when the battery generates heat by an accident.

Specifically, the layer B is designed to have a thickness, though in dependence on a number of layers in the multi-layered porous film, generally in the range of 0.1 micrometer to 20 micrometers both inclusive, and preferably in the range of 2 micrometers and 15 micrometers both inclusive in the case that the layer B is formed on one of surfaces or both of surfaces of the base film (the layer A). These figures indicate a total of thicknesses in the case that the layer B is formed on both of surfaces of the base film.

The layer B is designed to have a porosity preferably in the range of 20 to 85 volume percent both inclusive, and more preferably in the range of 40 to 75 volume percent both inclusive. If the layer B has a too low porosity, ion-permeability may be deteriorated, and if the layer B has a too high porosity, the layer B may be reduced with respect to strength.

The layer B is designed to have an average pore diameter preferably in the range of 0.005 micrometers to 0.3 micrometers both inclusive, and more preferably in the range of 0.01 micrometer to 0.2 micrometers both inclusive. If the layer B has a too small average pore diameter, ion-permeability may be deteriorated, and on the other hand, if the layer B has a too large average pore diameter, there may often occurs short-circuit due to dendrites to be generated in electrodes.

[Method of Fabricating Multi-Layered Porous Film]

The multi-layered porous film can be preferably fabricated through a use of a gravure roll mentioned later by a method including steps of directly coating a coating liquid containing an inorganic filler, a binder resin, and a solvent (a dispersion medium) onto the base film, forming a film (a coated film) comprised of a solid part and the solvent, and removing the solvent (the dispersion medium) to thereby form a functional layer (a process of gravure coating). The gravure coating process in which a gravure roll is employed makes it possible to fabricate a multi-layered porous film having a controlled thickness in a length-wise direction of a functional layer, even if the multi-layered porous film is in an industrial scale (for instance, a length is equal to or greater than 200 meters).

Any solvents (dispersion mediums) by which an inorganic filler and a binder resin contained in a coating liquid used for formation of a functional film are dispersed, if they are able to uniformly and stably solve or disperse an inorganic filler and a binder resin. A solvent to be used is determined in dependence on an inorganic filler and a binder resin to be used. Specifically, there may be selected, as a solvent, water, alcohol such as methanol, ethanol, and isopropanol, acetone, THF, toluene, xylene, hexane, N-methylpyrrolidone, N,N-dimethylacetoamide, N,N-dimethylformamide.

Any method of making a coating liquid by dispersing an inorganic filler and a binder resin may be selected, if the method makes it possible to ensure dispersion liquid-characteristic required for formation of a desired functional layer. For instance, there may be selected a method of carrying out mechanical agitation, a method of accomplishing dispersion by means of super-sonic waves, a method of accomplishing dispersion by means of a high pressure, and a method of dispersing mediums. The coating liquid may contain additional components except an inorganic filler and a binder resin, such as a dispersing agent, a plasticizing agent, and a pH regulator, as long as the addition does not deviate from the object of the present invention.

Furthermore, the coating liquid can be readily coated onto the base film by carrying out surface treatment to the base film prior to the coating, ensuring that adhesion between the functional layer and the base film may be enhanced after the coating liquid has been coated onto the base film. As a method of carrying out surface treatment, there may be selected a method of treating a surface by means of corona discharge, a method of mechanically roughing a surface, a method of treating a surface by means of a solvent, a method of treating a surface by means of acid, and a method of treating a surface with ultra-violet rays.

A method of removing a solvent out of the coating liquid after the coating liquid has been coated onto the base film may be a method of drying the coating liquid, but is not to be limited to a specific method. As a method of drying the coating liquid, there may be selected a method of air-drying the coating liquid, a method of drying the coating liquid by blowing wind to the coating liquid, a method of heating the coating liquid, or a method of depressurizing the coating liquid. As an alternative, the coating liquid may be dried after a solvent (a dispersion medium) contained in the coating liquid is replaced with another solvent.

Hereinbelow are explained a gravure roll (hereinafter, referred to as "a gravure roll in accordance with the present invention") to be preferably used for forming a functional layer in the multi-layered porous film in accordance with the present invention, and a process of gravure coating through the use of the gravure roll.

In the explanation made below, the words "a multi-layered porous film" and "a separator" mean the same as each other, and may be used without distinction.

The gravure roll in accordance with the present invention is comprised of a gravure roll including a roll body composed of a metal. A plurality of protrusions is formed on an outer surface of the roll body. The protrusions obliquely extend at a predetermined angle relative to a central axis of the roll body. A plurality of recesses each formed between the adjacent obliquely extending protrusions retains a coating liquid therein. The roll body is entirely covered on an outer surface thereof with a DLC layer. Each of the obliquely extending protrusions has a trapezoidal cross-section a head of which is cut down and which has a width gradually reducing towards the head.

The gravure roll in accordance with the present invention is partially characterized in that the roll body composed of a metal is entirely covered at an outer surface thereof with a DLC layer.

Diamond like carbon (DLC) of which the DLC layer is composed is a carbon material containing diamond-like carbon-carbon bonding, and has various advantages in a desired balance. For instance, DLC has a high hardness, a high resistance to abrasion, and a low frictional coefficient, and is chemically inactive and stable, and further, is not corroded even in a corrosion environment. A DLC layer can be fabricated by a conventional film-fabrication process such as chemical vapor deposition (CVD).

Thus, a DLC layer has a function of acting as a protection layer for protecting the roll body composed of a metal from hard inorganic fillers, and further, prevents the base film and a doctor blade from being abraded and/or damaged when the gravure roll slides on the base film or the doctor blade.

Each of the obliquely extending protrusions defining raised and recessed portions of the gravure roll is cut down at a head thereof, and is provided with enhanced slidability by means of the above-mentioned DLC layer. Thus, even if the obliquely extending protrusions make contact with the based film onto which a coating liquid is to be coated, it is possible to prevent the base film from being scratched and further, to prevent the obliquely extending protrusions from being abraded.

Furthermore, since each of the obliquely extending protrusions has a trapezoidal cross-section having a width gradually reducing towards a head thereof, it is possible to cause a coating liquid retained in each of a plurality of obliquely extending recesses formed between the adjacent obliquely extending protrusions, to be smoothly fed out along sidewalls of the obliquely extending protrusions, and it is further possible to reduce a volume of a coating liquid remaining in the obliquely extending recesses, resulting in that the recesses are prevented from being clogged, ensuring superior coating performance.

It is preferable that the above-mentioned DLC layer is a water-repellent DLC layer.

As mentioned above, DLC has a high resistance to both abrasion and chemicals. However, inorganic fillers may be aggregated, if a coating liquid containing therein an aqueous solvent sticks to a surface of the DLC layer formed on a surface of the gravure roll, in which case, a volume of a coating liquid retained at the gravure roll fluctuates, and hence, it is not possible to stably carry out coating.

Thus, by designing the DLC layer to be water-repellent, a coating liquid containing therein an aqueous solvent is unlikely to stick to inorganic fillers, and thus, it is possible to prevent the recesses from being clogged, ensuring that superior coating performance can be maintained. In order for the DLC layer to be water-repellent, fluorine may be doped into the DLC layer during fabrication thereof, for instance.

In the gravure roll in accordance with the present invention, the DLC layer entirely covering the roll body therewith preferably has a thickness equal to or greater than 0.1 micrometer, but equal to or smaller than 3 micrometers. By having a thickness in this range, the DLC layer can sufficiently show the above-mentioned original performances.

The DLC layer covering the roll body therewith may be fabricated by CVD, for instance. In dependence on a material of which the roll body is made, the DLC layer may have insufficient adhesion. Furthermore, if the DLC layer has defectiveness, for instance, if the DLC layer is cracked during fabrication thereof or during the gravure roll is being used, a coating liquid penetrates the DLC layer through the defectiveness, resulting in that a metal of which the roll body is made may be corroded.

Thus, it is preferable that the gravure roll in accordance with the present invention includes an intermediate layer between an outer surface of the roll body and the DLC layer in order to enhance adhesion between the DLC layer and the roll body, and further, to prevent a metal of which the roll body is made from making direct contact with a coating liquid, even if a coating liquid penetrates the DLC layer through a defectiveness.

As a material of which the intermediate layer is made, there is selected a material having high adhesion with both the DLC layer made of a carbon material and the roll body made of a metal, and further having a high resistance to components of a coating liquid. As a preferable material, there is selected hard chromium or nickel, and preferably selected hard chromium. A thickness of the intermediate layer is selected in such a range that the above-mentioned performances of the intermediate layer can be ensured. In the case that the intermediate layer is composed of hard chromium, it is preferable that the intermediate layer has a thickness in the range of 10 micrometers to 30 micrometers both inclusive.

In the gravure roll in accordance with the present invention, it is preferable that each of the obliquely extending recesses has a trapezoidal cross-section.

By designing each of the obliquely extending recesses formed between the obliquely extending protrusions, to have a trapezoidal cross-section, it is possible to prevent a coating liquid from remaining at a bottom of each of the obliquely extending recesses, ensuring that the recesses are prevented from being clogged.

It is possible to coat the coating liquid onto the base film at a constant amount by using the gravure roll having the above-mentioned features, even if the coating liquid contains hard inorganic fillers. Accordingly, it is possible to fabricate the multi-layered porous film including the functional layer having high uniformity. Furthermore, since the gravure roll has superior slidability, the base film is difficult to be abraded and/or damaged, even if the gravure roll makes contact with the base film onto which the coating liquid is to be coated by the gravure roll.

Accordingly, the gravure roll makes it possible to stably coat a constant volume of the coating liquid onto a surface of the base film, ensuring it possible to fabricate the multi-layered porous film having uniform quality with a high yield. In particular, it is possible to fabricate the multi-layered porous film in which a difference between a maximum basis weight and a minimum basis weight of the separator in a length-wise direction thereof is equal to or smaller than 2 grams/m$^2$, the basis weight being measured every 100 meters interval.

Preferred embodiments of a process of gravure coating through the use of the gravure roll in accordance with the present invention will be explained hereinbelow with reference to drawings. Parts or elements common in all drawings are provided with the same reference numerals, and will not be doubly explained.

First Embodiment

How to use an apparatus 100 for carrying out a gravure coating process, including the gravure roll in accordance with the first embodiment of the present invention, is described hereinbelow with reference to FIG. 1.

The apparatus 100 for carrying out a gravure coating process includes, as primary parts, a gravure roll 1, a backup roll 2, and a doctor blade 3.

The gravure roll 1 includes a plurality of obliquely extending recesses, as detailed later. The gravure roll 1 is rotated by a driver (not illustrated) in such a condition that a lower portion of the gravure roll 1 is soaked in a coating liquid S, and thus, coats the coating liquid S onto a base film F with the coating liquid being retained in the obliquely extending recesses.

The backup roll 2 enables the gravure roll 1 to stably coat the coating liquid onto the base film F. The doctor blade 3 controls a volume of the coating liquid to be retained on a surface of the gravure roll 1.

The coating liquid S is comprised of a solvent in which inorganic fillers and binder resins accomplishing a target function of the functional layer are solved or dispersed. Since the inorganic fillers, the binder resins and the solvent have been explained above in the paragraphs titled "[Functional layer (Layer B)]", they are not explained here.

The base film onto which the coating liquid is coated is comprised of a porous polyolefin film capable of providing the shut-down function to a separator.

Since the base film has been explained above in the paragraphs titled "[Base film (layer A)]", it is not explained here.

The gravure roll 1 in accordance with the first embodiment is explained hereinbelow in detail.

Figure 2:
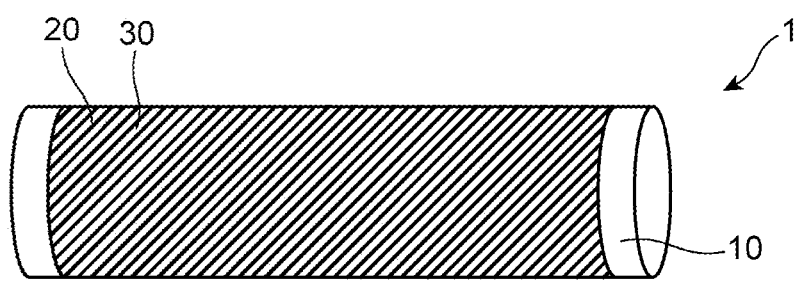
FIG. 2 is a perspective view of the gravure roll to be used in the embodiment of the present invention.
Figure 3:
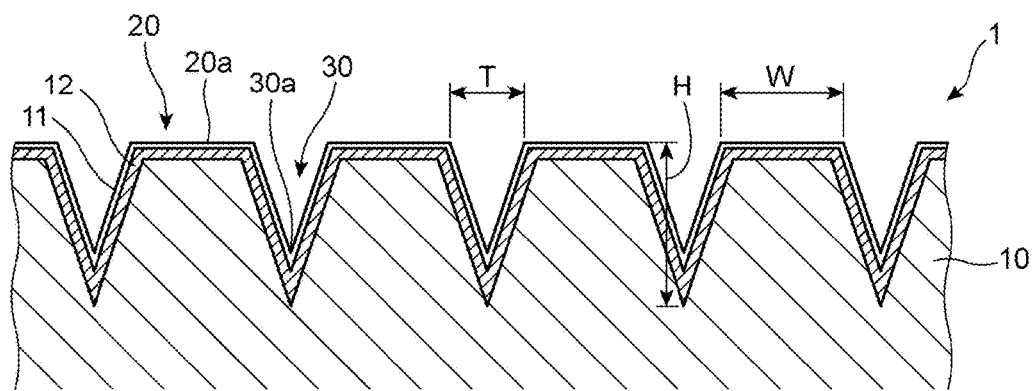
FIG. 3 is an enlarged cross-sectional view of a plurality of the obliquely extending protrusions and a plurality of the obliquely extending recesses both formed on a surface of the gravure roll to be used in the first embodiment of the present invention.

FIG. 2 is a perspective view of the gravure roll 1, and FIG. 3 is an enlarged cross-sectional view of a plurality of the obliquely extending protrusions 20 and a plurality of the obliquely extending recesses 30 both formed on an outer surface of the gravure roll 1. In FIG. 3, a curvature of the gravure roll 1 is not illustrated.

The roll body 10 of the gravure roll 1 is formed on an outer surface thereof with a plurality of obliquely extending protrusions 20 and a plurality of obliquely extending recesses 30. The roll body 10 in the first embodiment has a diameter of 150 mm and a length of 800 mm, and is made of stainless steel. It should be noted that a size of the roll body 10 and a material of which the roll body 10 is made are not to be limited to those specific ones, but to be suitably determined in accordance with purposes thereof.

As illustrated in FIG. 3, the roll body 10 is covered entirely on an outer surface thereof with a DLC layer 11. An intermediate layer 12 is formed between the roll body 10 and the DLC layer 11.

DLC (diamond like carbon) of which the DLC layer 11 is composed is a carbon material containing diamond-like carbon-carbon bonding therein, and has various advantages in a desired balance. For instance, DLC has a high hardness, a high resistance to abrasion, and a low frictional coefficient in a lubrication environment, and further, DLC does not abrade and scratch an object with which the gravure roll slides (a low-attacking characteristics), is chemically inactive and stable, and further, is not corroded even in a corrosion environment.

The DLC layer in the first embodiment has a thickness of 1 micrometer. It is preferable that the DLC layer 11 has a thickness equal to or greater than 0.1 micrometer, but equal to or smaller than 3 micrometers. By having a thickness in the range, the DLC layer is able to maintain a resistance to chemicals to thereby effectively prevent solids derived from dried and aggregated inorganic fillers from sticking thereto. A thickness of the DLC layer can be measured by means of an optic interference-type measurement device or a laser displacement gauge. A preferable example of an optic interference-type measurement device is MODEL: EL2 commercially available from Yugen Kaisha Opt-Electronics Laboratory.

The DLC layer 11 is composed of water-repellent DLC. Though DLC may be hydrophilic in dependence on a content of elemental carbons, DLC can be designed to be water-repellent by dispersing fluorine in atomic or ionic state.

DLC (fluorine DLC) containing therein fluorine having hydrophilic characteristics not only has original characteristics of DLC such as a resistance to chemical and a resistance to abrasion, but also is more water-repellent than a DLC coating layer containing no fluorine therein. Accordingly, by designing the DLC layer 11 to be composed of fluorine DLC, the gravure roll in accordance with the present invention is able to prevent solids derived from the inorganic fillers from sticking thereto more effectively by virtue of hydrophilic characteristics of the DLC layer.

Between a surface of the roll body 10 and the DLC layer 11 is formed the intermediate layer 12 having a thickness of 15 micrometers and made of hard chromium. The intermediate layer 12 enhances adhesion between the roll body 10 and the DLC layer 11, and further, prevents a metal of which the roll body 10 is made from making direct contact with a coating liquid, even if a coating liquid leaks through a defectiveness of the DLC layer 11. Though the intermediate layer 12 in the first embodiment is designed to have a thickness of 15 micrometers, it should be noted that the intermediate layer 12 can have any thickness, if the thickness enhances adhesion between the roll body 10 and the DLC layer 11, and prevents a metal of which the roll body 10 is made from making direct contact with a coating liquid, even if a coating liquid S leaks through a defectiveness of the DLC layer 11. In the case that the intermediate layer 12 is made of hard chromium, it is preferable that the intermediate layer 12 has a thickness in the range of 10 micrometers to 30 micrometers both inclusive. A thickness of the intermediate layer can be measured by means of a laser displacement gauge.

The obliquely extending protrusions 20 are formed on an outer surface of the roll body 10 to be spiral at a predetermined angle relative to a central axis of the roll body 10. An angle between the obliquely extending protrusions 20 and the central axis of the roll body 10 is set to be equal to 45 degrees in the first embodiment, but may be changed into another angle, if necessary. The angle is set generally in the range of 30 degrees to 60 degrees both inclusive. Furthermore, as illustrated in FIG. 3, an upper portion 20a is cut away in each of the obliquely extending protrusions 20, and thus, each of the obliquely extending protrusions 20 has a trapezoidal cross-section having a width gradually decreasing towards the upper portion 20a.

Each of the obliquely extending recesses 30 is formed between the adjacent obliquely extending protrusions 20. As illustrated in FIG. 1, after the coating liquid S has been temporarily retained in each of the obliquely extending recesses 30, the coating liquid S retained in each of the obliquely extending recesses 30 is coated onto a surface of the base film F when the gravure roll 1 makes contact with the continuously fed base film F.

In the gravure roll 1, a width W of the upper portion 20a is set to be 40 micrometers, a distance T between the upper portions 20a of the adjacent obliquely extending protrusions 20 is set to be 420 micrometers, and a height H of the obliquely extending recess 30 defined as a distance between the upper portion 20a of the obliquely extending protrusion 20 and the bottom 30a is set to be 184 micrometers.

The distance T and the height H define a volume of each of the obliquely extending recesses 30, and hence, are determined in dependence on a desired volume of a coating liquid to be retained, that is, a volume of a coating liquid to be used in single coating. The width W of the upper portion 20a is set to be generally in the range of 10 micrometers to 50 micrometers both inclusive, the distance T between the upper portions of the adjacent obliquely extending protrusions is set to be generally in the range of 100 micrometers to 500 micrometers both inclusive, and the height H of each of the obliquely extending recesses is set to be generally in the range of 100 micrometers to 300 micrometers both inclusive.

The obliquely extending protrusions 20 and the obliquely extending recesses 30 of the gravure roll 1 can be formed by spirally grinding the unprocessed roll body 10 by engraving to thereby define the obliquely extending recesses 30, and cutting summits of the protrusions to thereby define the obliquely extending protrusions 20 (the upper portions 20a).

The multi-layered porous film (the separator) including the functional layer formed on the base film F can be obtained by drying the base film F onto which the coating liquid S has been coated.

The resultant multi-layered porous film has a length generally in the range of 200 meters to 10000 meters both inclusive, preferably in the range of 500 meters to 5000 meters both inclusive, and more preferably in the range of 1000 meters to 3000 meters both inclusive. By cutting the multi-layered porous film having such a length as mentioned above into pieces, each of the pieces can be used as a part of a battery (the separator).

A difference between a maximum basis weight and a minimum basis weight of the multi-layered porous film in a length-wise direction thereof, measured every 100 meters interval, is preferably equal to or smaller than 2 grams/m$^2$, more preferably equal to or smaller than 1.6 grams/m$^2$, further preferably equal to or smaller than 1.3 grams/m$^2$, still further preferably equal to or smaller than 1 gram/m$^2$, and most preferably equal to or smaller than 0.5 grams/m$^2$. The smaller difference enables the multi-layered porous film to have more uniform quality.

That is, the gravure roll in accordance with the present invention makes it possible to enable the roll body to be difficult to be abraded, even if a coating liquid containing therein hard inorganic fillers is used, prevent the base film from being scratched, even if the gravure roll makes contact with the base film onto which a coating liquid is to be coated, and stably carry out a gravure coating process. Thus, there can be obtained the multi-layered porous film in which the above-mentioned difference is small and which has uniform quality.

The multi-layered porous film has a thickness generally in the range of 9 micrometers to 80 micrometers both inclusive, preferably in the range of 10 micrometers to 50 micrometers, and more preferably in the range of 12 micrometers to 35 micrometers both inclusive, taking into account that the multi-layered porous film is used as a separator.

Furthermore, a difference between a maximum thickness and a minimum thickness of the multi-layered porous film in a length-wise direction thereof, to be measured every 100 meters interval, is preferably equal to or smaller than 1.5 micrometers, and more preferably equal to or smaller than 1.0 micrometer. If the difference is smaller than 1.5 micrometers, a separator comprised of the multi-layered porous film having the smaller difference can have more uniform quality, and further, a battery including the separator has the smaller fluctuation in quality. The multi-layered porous film having a constant thickness has the advantage that when the multi-layered porous film is wound, the multi-layered porous film is not likely to be locally collapsed, because a pressure uniformly acts on a surface of the separator.

Second Embodiment

A gravure roll in accordance with the second embodiment of the present invention is explained hereinbelow with reference to the drawings. Since the gravure roll in accordance with the second embodiment of the present invention, and an apparatus for carrying out a gravure coating process, including the gravure roll in accordance with the second embodiment, are basically identical in structure with those having been explained in the first embodiment of the present invention with reference to FIGS. 1 and 2, explanation about the same elements as those in the first embodiment are simplified or omitted.

Figure 4:
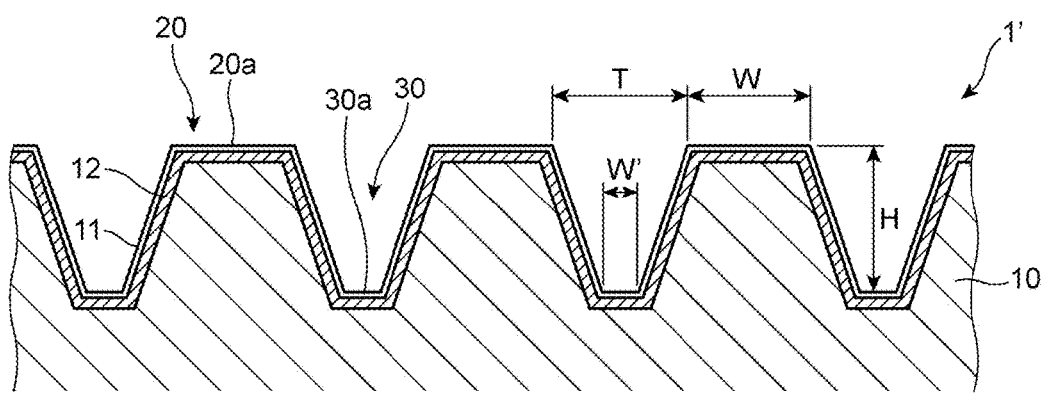
FIG. 4 is an enlarged cross-sectional view of a plurality of the obliquely extending protrusions and a plurality of the obliquely extending recesses both formed on a surface of the gravure roll to be used in the second embodiment of the present invention.

FIG. 4 is an enlarged cross-sectional view of a plurality of the obliquely extending protrusions 20 and a plurality of recesses 30 formed on an outer surface of a gravure roll 1'. In FIG. 4, a curvature of the gravure roll is not illustrated.

In the gravure roll 1', a plurality of the obliquely extending protrusions 20 and a plurality of recesses 30 are formed on an outer surface of the roll body 10. The roll body 10 in the second embodiment is designed to have a diameter of 150 mm and a length of 800 mm, and is made of stainless steel. It should be noted that a size of the roll body 10 and a material of which the roll body 10 is made are not to be limited to those specific ones, but to be suitably determined in accordance with purposes thereof.

As illustrated in FIG. 4, the roll body 10 is entirely covered on an outer surface thereof with the DLC layer 11, and the intermediate layer 12 is formed between the roll body 10 and the DLC layer 11.

The structure and performances of the DLC layer 11 are identical with those of the DLC layer in the first embodiment, and accordingly, are not explained.

The DLC layer 11 in the second embodiment is designed to have a thickness of 1 micrometer. It is preferable that the DLC layer 11 has a thickness equal to or greater than 0.1 micrometer, but equal to or smaller than 3 micrometers. By having a thickness in the range, the DLC layer is able to maintain a resistance to chemicals, and further, effectively prevent solids such as dried and aggregated inorganic fillers from sticking thereto. The DLC layer 11 is composed of water-repellent DLC. Though DLC may be hydrophilic in dependence on a content of elemental carbons, DLC can be water-repellent by dispersing fluorine therein in atomic or ionic state.

Between a surface of the roll body 10 and the DLC layer 11 is formed the intermediate layer 12 having a thickness of 15 micrometers and composed of hard chromium. The structure and performances of the intermediate layer 12 are identical with those of the intermediate layer in the first embodiment, and accordingly, are not explained.

The obliquely extending protrusions 20 are spirally formed on an outer surface of the roll body 10 to make a predetermined angle relative to a center axis of the roll body 10. In the second embodiment, the angle of the obliquely extending protrusions 20 relative to a center axis of the roll body 10 is set to be 45 degrees, but it should be noted that the angle may be changed into another angle, if necessary. The angle is set to be generally in the range of 30 degrees to 60 degrees. Furthermore, as illustrated in FIG. 4, each of the obliquely extending protrusions 20 has a trapezoidal cross-section in which the upper portion 20a is cut away, and a width of the obliquely extending protrusion 20 gradually reduces towards the upper portion 20a.

Each of the obliquely extending recesses 30 is formed between the adjacent obliquely extending protrusions 20. Whereas the bottom 30a in each of the obliquely extending recesses 30 in the first embodiment is designed to make an acute angle, the bottom 30a in each of the obliquely extending recesses 30 in the second embodiment is designed to be flat. That is, each of the obliquely extending recesses 30 in the second embodiment is designed to have a trapezoidal cross-section.

In the case that the bottom 30a is designed to make an acute angle, a volume of the coating liquid to be coated onto the base film fluctuates with the lapse of time, because the coating liquid S remains in the recess, or inorganic fillers contained in the coating liquid S are adhered to the bottom 30a, when the coating is temporarily stopped. In contrast, in the case that the bottom 30a is designed to be flat, and further, each of the obliquely extending recesses 30 has a trapezoidal cross-section, it is difficult for the coating liquid S to remain in the obliquely extending recesses 30, a volume of the coating liquid to be coated onto the base film is made stable, and even if solids derived from the inorganic fillers are adhered to the bottom 30a, the solids can be readily removed off.

In the gravure roll 1', a width W of the upper portion 20a is set to be 30 micrometers, a distance T between the upper portions 20a of the adjacent obliquely extending protrusions 20 is set to be 360 micrometers, a height H of the obliquely extending recess 30 defined as a distance between the upper portion 20a of the obliquely extending protrusion 20 and the bottom 30a is set to be 150 micrometers, and a width W' of the bottom 30a is set to be 65 micrometers.

The distance T, the height H, and the width W' of the bottom define a volume of each of the obliquely extending recesses 30, and hence, are determined in dependence on a desired volume of a coating liquid to be retained in the recess, that is, a volume of a coating liquid to be supplied in single coating. The distance T between the upper portions of the obliquely extending protrusions situated adjacent to each other is set to be generally in the range of 100 micrometers to 500 micrometers both inclusive, the height H of each of the obliquely extending recesses is set to be generally in the range of 100 micrometers to 300 micrometers both inclusive, and the width W' of the bottom is set to be generally in the range of 50 micrometers to 200 micrometers both inclusive.

The obliquely extending protrusions 20 and the obliquely extending recesses 30 of the gravure roll 1' can be formed by spirally grinding the unprocessed roll body 10 by engraving to thereby define the obliquely extending recesses 30 (the bottoms 30a), and cutting summits of remaining protrusions to thereby define the obliquely extending protrusions 20 (the upper portions 20a).

The multi-layered porous film (the separator) including the functional layer formed on the base film F can be obtained by removing a solvent out of the base film F onto which the coating liquid S has been coated.

The multi-layered porous film has a length generally in the range of 200 meters to 10000 meters both inclusive, preferably in the range of 500 meters to 5000 meters both inclusive, and more preferably in the range of 1000 meters to 3000 meters both inclusive. By cutting the multi-layered porous film into pieces, each of the pieces can be used as a part of a battery (a separator).

A difference between a maximum basis weight and a minimum basis weight of the multi-layered porous film in a length-wise direction thereof, measured every 100 meters interval, is preferably equal to or smaller than 2 grams/m$^2$, more preferably equal to or smaller than 1.6 grams/m$^2$, further preferably equal to or smaller than 1.3 grams/m$^2$, still further preferably equal to or smaller than 1 gram/m$^2$, and most preferably equal to or smaller than 0.5 grams/m$^2$. The smaller difference enables the separator to have more uniform quality.

That is, the gravure roll in accordance with the present invention makes it possible to enable the roll body to be difficult to be abraded, even if a coating liquid containing therein hard inorganic fillers is used, prevent the base film from being scratched, even if the gravure roll makes contact with the base film onto which a coating liquid is to be coated, and stably carry out a gravure coating process. Thus, it is possible to have the separator in which the above-mentioned difference is small and accordingly which has uniform quality.

The multi-layered porous film has a thickness generally in the range of 9 micrometers to 80 micrometers both inclusive, preferably in the range of 10 micrometers to 50 micrometers, and more preferably in the range of 12 micrometers to 35 micrometers both inclusive, taking into account that the multi-layered porous film is used as a separator.

Furthermore, a difference between a maximum thickness and a minimum thickness of the multi-layered porous film in a length-wise direction thereof, to be measured every 100 meters interval, is preferably equal to or smaller than 1.5 micrometers, and more preferably equal to or smaller than 1.0 micrometer. If the difference is smaller than 1.5 micrometers, a separator comprised of the multi-layered porous film having the smaller difference can have more uniform quality, and further, a battery including the separator has the smaller fluctuation in quality. The multi-layered porous film having a constant thickness has the advantage that when the multi-layered porous film is wound, the multi-layered porous film is not likely to be locally collapsed, because a pressure uniformly acts on a surface of the separator.

The embodiments of the gravure coating process in which the gravure roll in accordance with the present invention is used have been explained so far with reference to the drawings. It should be noted that they are just examples of the fabrication of the multi-layered porous film in accordance with the present invention, and that any structure other than the above-mentioned ones may be selected as long as it is contained in the subject-matter of the present invention.

[Nonaqueous-Electrolyte Secondary Battery]

As mentioned above, the multi-layered porous film in accordance with the present invention is cut into a plurality of pieces, each of which can be preferably used as a separator to be used in a nonaqueous-electrolyte secondary battery such as a lithium secondary battery. In the case of being used as a separator, the multi-layered porous film is designed to have a length in dependence on a type and/or a size of a battery. For instance, in the case that the multi-layered porous film is used in 18650 cylindrical lithium secondary battery, which is a general nonaqueous-electrolyte secondary battery, the multi-layered porous film is designed to have a length generally in the range of about 0.5 meters to about 1.5 meters both inclusive.

Hereinbelow, a nonaqueous-electrolyte secondary battery including a separator comprised of the multi-layered porous film in accordance with the present invention is referred to as "a nonaqueous-electrolyte secondary battery in accordance with the present invention".

The nonaqueous-electrolyte secondary battery including a separator comprised of the multi-layered porous film has a high load characteristic, and accomplish the shut-down function even when a battery generates heat, ensuring it possible to avoid an anode and a cathode from making contact with each other due to shrinkage of a separator, and to accomplish a nonaqueous-electrolyte secondary battery exhibiting enhanced safety.

Hereinbelow are explained components of the nonaqueous-electrolyte secondary battery in accordance with the present invention other than a separator, specifically, electrolyte, an anode and a cathode with reference to a lithium secondary battery as an example of the nonaqueous-electrolyte secondary battery.

A nonaqueous-electrolyte may be comprised of a non-aqueous-electrolyte containing an organic solvent in which lithium salt, for instance, is solved. As lithium salt, there may be selected alone or in combination of one or more among $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salt, and $LiAlCl_4$. It is preferable to select, as lithium salt, at least one fluorine-containing lithium salt from a group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

As a nonaqueous-electrolyte, there may be selected among carbonates such as propylene carbonate, ethylene carbonate, dimethyl carbonate, diethyl carbonate, ethylmethyl carbonate, 4-trifluoromethyl-1,3-dioxolan-2-on, and 1,2-di(methoxycarbonyloxy)ethane, ethers such as 1,2-dimethoxyethane, 1,3-dimethoxypropane, pentafluoropropyl methyl ether, 2,2,3,3-tetrafluoropropyl difluoromethyl ether, tetrahydrofuran, 2-methyltetrahydrofuran, esters such as methyl formate, methyl acetate, and gamma-butyrolactone, nitriles such as acetonitrile and butyronitrile, amides such as N,N-dimethylformamide and N,N-dimethylacetoamide, carbamates such as 3-methyl-2-oxazolidone, sulfur-containing compounds such as sulfolane, dimethylsulfoxide, and 1,3-propanesultone or these compounds into which a fluorine group is introduced into the aforementioned substances. Two or more among these compounds may be mixed with each other.

Among the above-mentioned nonaqueous-electrolytes, it is preferable to use a nonaqueous-electrolyte containing carbonates therein, and it is more preferable to use a mixture of cyclic carbonate and acyclic carbonate, or a mixture of cyclic carbonate and ether. As a mixture of cyclic carbonate and acyclic carbonate, it is preferable to use a mixture of ethylene carbonate, dimethyl carbonate, and ethylmethyl carbonate, because the mixture can work in a broad range of a temperature, and further, is refractory even if graphite such as natural graphite and artificial graphite are used as an active material to a cathode.

An anode sheet is comprised generally of a sheet including an electric collector on which a mixture of an anode active material, an electrically conductive agent, and a binder is carried. Specifically, an anode active material may contain a material which can be doped and de-doped with lithium ions, an electrically conductive agent may contain a carbonaceous material, and a binder may contain a thermoplastic resin. As a material which can be doped and de-doped with lithium ions, there may be selected a lithium complex oxide containing at least one transition metal such as V, Mn, Fe, Co and Ni. It is preferable to select a lithium complex oxide having an α-$NaFeO_2$ type structure, such as lithium nickelate and lithium cobaltate, or a lithium complex oxide having a spinel type structure, such as lithium manganese spinel, because they have a high average discharge potential.

The lithium complex oxide may contain various metallic elements. In particular, it is preferable to use a complex lithium nickelate containing at least one metallic element selected from a group consisting of Ti, V, Cr, Mn, Fe, Co, Cu, Ag, Mg, Al, Ga, In and Sn such that the at least one metallic element is contained in the range of 0.1 mol % to 20 mol % both inclusive relative to a sum of a molar number of the at least one metallic element and a molar number of Ni contained in lithium nickelate, because the cyclability is enhanced when used at a high capacity.

The binder may be selected among thermoplastic resins such as polyvinylidene fluoride, copolymer of vinylidene fluoride, polytetrafluoroethylene, copolymer of tetrafluoroethylene-hexafluoropropylene, copolymer of tetrafluoroethylene-perfluoroalkylvinylether, copolymer of ethylene-tetrafluoroethylene, copolymer of vinylidenefluoride-hexafluoropropylene-tetrafluoroethylene, thermoplastic polyimide, polyethylene, and polypropylene.

As the electrically conductive agent, there may be selected among carbonaceous materials such as natural graphite, artificial graphite, cokes, and carbon black. The electrically conductive agent may be used alone, or in combination of artificial graphite and carbon black, for instance.

A cathode sheet may be comprised of a sheet including a cathode electric collector on which a material which can be doped and de-doped with lithium ions is carried, lithium metals, or lithium alloys. As a material which can be doped and de-doped with lithium ions, there may be selected among carbonaceous materials such as natural graphite, artificial graphite, cokes, carbon black, pyrolytic carbon, carbon fibers, and burned organic polymer materials, oxides which can be doped and de-doped with lithium ions at a potential lower than the same of an anode, and chalcogenide such as sulfide.

It is preferable to use, as the above-mentioned carbonaceous material, a carbonaceous material containing a graphite material as a main constituent, such as natural graphite and artificial graphite, because it has a high potential flatness and a low average discharge potential, and hence, it can have a high energy density when used in combination with an anode.

The cathode electric collector may be composed of Cu, Ni or stainless steel. It is preferable that the cathode electric collector is composed of Cu, because it is difficult for Cu to make alloy with lithium in a lithium secondary battery, and Cu can be readily processed to be a thin film. A method of carrying a mixture containing a cathode active material on the cathode electric collector may be comprised of a method including a step of applying a pressure for shaping, or a method including steps of solving the mixture in a solvent into a paste condition, coating the mixture onto the cathode electric collector, drying the mixture, and pressing the mixture.

A shape of a battery is not to be limited to a specific one. A battery may be in the form of a paper, a coin, a cylinder, a rectangle, or a laminate.

The nonaqueous-electrolyte secondary battery in accordance with the present invention has been explained so far with reference to a lithium secondary battery as an example of the nonaqueous-electrolyte secondary battery, but is not to be limited to a lithium secondary battery. Battery components other than a separator may be selected in dependence on a target nonaqueous-electrolyte secondary battery. For instance, in the case that the nonaqueous-electrolyte secondary battery is comprised of a sodium secondary battery, battery components suitable to a sodium secondary battery (an anode, a cathode, and electrolyte) may be chosen.

Exemplary Embodiments

The present invention is explained hereinbelow in more detail, but the present invention is not to be limited to the examples explained below.

In the explanation made below, the terms "a multi-layered porous film" and "a separator" mean the same as each other, and may be used without distinction.

[1. Evaluation]

Physical properties of the separator (the multi-layered porous film) were evaluated as follows.

[1. Basis Weight of the Separator (Unit: $g/m^2$)]

A square sample having a side having a length of 0.08 meters was cut out of the separator, and a weight W (grams) of the sample was measured. The measured weight W (grams) was divided by an area S ($m^2$) of the separator (=0.08×0.08) to thereby calculate a basis weight (W/S) of the separator.

[1-2. Thickness of the Separator (Unit: Micrometer)]

A thickness of the separator was measured in accordance with JIS (Japanese Industrial Standards) (K7130-1999).

[1-3. Gas-Permeability of the Separator (Unit: Seconds/100 cc)]

A gas-permeability of the separator was measured in accordance with JIS P8117 by means of the digital timer Gurley type densometer commercially available from Kabushiki Kaisha Toyo Seiki Seisakujyo.

[2. Base Film]

There was prepared a mixture by 100 weight part, including high molecular weight polyethylene powder (GUR4032 commercially available from Ticona Kabushiki Kaisha) by 70 weight %, and polyethylene wax (FNP-0115 commercially available from Nippon Seirou Kabushiki Kaisha) having a weight-average molecular weight of 1000, by 30 weight %. To the mixture were added oxidation inhibitor (Irg1010 commercially available from Chiba Specialty Chemicals Kabushiki Kaisha) by 0.4 weight part, oxidation inhibitor (P168 commercially available from Chiba Specialty Chemicals Kabushiki Kaisha) by 0.1 weight part, and sodium stearate by 1.3 weight part. Furthermore, calcium carbonate (commercially available from Maruo Kabushiki Kaisha) having an average particle diameter of 0.1 micrometer were added such that the calcium carbonate has 38 volume % relative to the total volume. After the resultant mixture was stirred in a Henschel mixer with the mixture being retained in powder condition, the mixture was molten and mixed in a bi-axial mixer into polyolefin resin composition.

The resultant polyolefin resin composition was rolled by means of a pair of rolls having been heated at a surface thereof up to 150 degrees centigrade, to thereby fabricate a sheet. By immersing the sheet into aqueous solution of hydrochloric acid (hydrochloric acid: 4 mol/liter, non-ionic surfactant: 0.5 weight %), calcium carbonate was removed out of the sheet. Then, the sheet was rolled at a certain magnification in 105 degrees centigrade environment to thereby obtain a porous polyolefin film (A1) having a thickness of 16.0 micrometers, a porosity of 53%, and a gas-permeability of 100 seconds/100 cc.

[3. Coating Liquid]

The requirements for making the coating liquid (B1) containing a hard inorganic filler are as follows.

There was prepared a coating liquid (B1) by adding and mixing carboxymethyl cellulose (CMC) (1110 commercially available from Daisel Fine Chem Kabushiki Kaisha) having a true specific gravity of 1.6 $g/cm^3$, and alumina powder (AKP3000 commercially available from Sumitomo Kagaku Kabushiki Kaisha) having a true specific gravity of 4.0 $g/cm^3$ to a solvent such that a weight ratio of CMC and alumina power was 3:100 and a concentration of solids was 28 weight %. The solvent contained water and isopropyl alcohol by a weight ratio of 95:5.

Example 1

The coating liquid was coated onto a base film through the use of an apparatus for carrying out a gravure coating process, including the gravure roll in accordance with the above-mentioned first embodiment. A thickness of the DLC layer 11 was measured by means of an optic interference-type gauge (MODEL: EL2 commercially available from Yugen Kaisha Opt Electronics Laboratory). A thickness of the intermediate layer 12 was measured by means of a laser displacement gauge.

The coating liquid (B1) was coated onto a surface of the base film, that is, the porous polyolefin film (A1) to which corona treatment was applied. Thereafter, the coating liquid was dried at 70 degrees centigrade to thereby obtain a separator (C1) having a length of 1500 meters.

Comparative Example 1

Through the use of an apparatus for carrying out a gravure coating process, including a gravure roll having the same structure as that of the gravure roll in accordance with the above-mentioned first embodiment except no inclusion of the DLC layer, the coating liquid (B1) was coated onto a surface of the porous polyolefin film (A1) to which corona treatment was applied. Thereafter, the coating liquid was dried at 70 degrees centigrade to thereby obtain a separator (C2) having a length of 1500 meters.

Example 2

Through the use of an apparatus for carrying out a gravure coating process, including the gravure roll in accordance with the above-mentioned second embodiment, the coating liquid (B1) was coated onto a surface of the porous polyolefin film (A1) to which corona treatment was applied. Thereafter, the coating liquid was dried at 70 degrees centigrade to thereby obtain a separator (C3) having a length of 1300 meters.

Example 3

Through the use of an apparatus for carrying out a gravure coating process, including the gravure roll in accordance with the above-mentioned second embodiment, the coating liquid (B1) was coated onto a surface of the porous polyolefin film (A1) to which corona treatment was applied. Thereafter, the coating liquid was dried at 70 degrees centigrade to thereby obtain a separator (C4) having a length of 1100 meters.

A basis weight, a film thickness and a gas-permeability of the resultant separators (C1 to C4) were measured at 100 meters interval. The measurement results are shown in Tables 1 to 3.

TABLE 1

|  | Distance from Point 1 | Basis weight in Example 1 (g/m$^2$) | Basis weight in Comparative Example 1 (g/m$^2$) | Basis weight in Example 2 (g/m$^2$) | Basis weight in Example 3 (g/m$^2$) |
| --- | --- | --- | --- | --- | --- |
| Point 1 | 0 m | 18.06 | 19.23 | 21.75 | 21.08 |
| Point 2 | 100 m | 18.30 | 18.86 | 21.56 | 20.98 |
| Point 3 | 200 m | 18.19 | 18.83 | 21.19 | 20.88 |
| Point 4 | 300 m | 18.56 | 18.89 | 20.96 | 21.09 |
| Point 5 | 400 m | 18.41 | 18.34 | 21.14 | 20.98 |
| Point 6 | 500 m | 18.28 | 18.25 | 21.05 | 20.94 |
| Point 7 | 600 m | 18.41 | 18.05 | 21.03 | 20.96 |
| Point 8 | 700 m | 18.06 | 18.03 | 21.11 | 20.79 |
| Point 9 | 800 m | 18.09 | 17.63 | 20.88 | 20.67 |
| Point 10 | 900 m | 18.13 | 17.42 | 20.83 | 20.89 |
| Point 11 | 1000 m | 18.22 | 17.56 | 20.69 | 20.77 |
| Point 12 | 1100 m | 17.97 | 17.44 | 20.69 | 20.82 |
| Point 13 | 1200 m | 17.86 | 17.31 | 20.53 |  |
| Point 14 | 1300 m | 18.06 | 17.28 | 20.53 |  |
| Point 15 | 1400 m | 17.88 | 17.34 |  |  |
| Point 16 | 1500 m | 17.95 | 16.92 |  |  |
| Difference between Max. and Min. |  | 0.70 | 2.31 | 1.22 | 0.42 |

TABLE 2

|  | Distance from Point 1 | Film Thickness in Example 1 (micron) | Film Thickness in Comparative Example 1 (micron) | Film Thickness in Example 2 (micron) | Film Thickness in Example 3 (micron) |
| --- | --- | --- | --- | --- | --- |
| Point 1 | 0 m | 22.7 | 23.6 | 25.2 | 24.8 |
| Point 2 | 100 m | 22.9 | 23.4 | 25.2 | 24.8 |
| Point 3 | 200 m | 23.0 | 23.3 | 25.0 | 24.8 |
| Point 4 | 300 m | 23.2 | 23.4 | 24.6 | 24.9 |
| Point 5 | 400 m | 23.2 | 23.3 | 24.8 | 24.8 |
| Point 6 | 500 m | 23.2 | 23.1 | 25.0 | 24.8 |
| Point 7 | 600 m | 23.2 | 23.0 | 24.9 | 24.8 |
| Point 8 | 700 m | 23.0 | 23.0 | 24.9 | 24.6 |
| Point 9 | 800 m | 23.0 | 22.8 | 24.6 | 24.6 |
| Point 10 | 900 m | 22.8 | 22.6 | 24.7 | 24.6 |
| Point 11 | 1000 m | 23.2 | 22.7 | 24.6 | 24.7 |
| Point 12 | 1100 m | 22.8 | 22.7 | 24.6 | 24.8 |
| Point 13 | 1200 m | 22.9 | 22.6 | 24.6 |  |
| Point 14 | 1300 m | 23.0 | 22.6 | 24.4 |  |
| Point 15 | 1400 m | 22.8 | 22.3 |  |  |
| Point 16 | 1500 m | 22.8 | 22.0 |  |  |
| Difference between Max. and Min. |  | 0.5 | 1.6 | 1.22 | 0.3 |

TABLE 3

|  | Distance from Point 1 | Gas-permeability in Example 1 (second/100 cc) | Gas-permeability in Comparative Example 1 (second/100 cc) | Gas-permeability in Example 2 (second/100 cc) | Gas-permeability in Example 3 (second/100 cc) |
| --- | --- | --- | --- | --- | --- |
| Point 1 | 0 m | 115 | 120 | 122 | 121 |
| Point 4 | 300 m | 120 | 116 | 121 | 121 |

TABLE 3-continued

| | Distance from Point 1 | Gas-permeability in Example 1 (second/100 cc) | Gas-permeability in Comparative Example 1 (second/100 cc) | Gas-permeability in Example 2 (second/100 cc) | Gas-permeability in Example 3 (second/100 cc) |
|---|---|---|---|---|---|
| Point 6 | 500 m | 120 | 120 | 121 | 121 |
| Point 9 | 800 m | 117 | 115 | 121 | 120 |
| Point 12 | 1100 m | 115 | 118 | 120 | 121 |
| Point 14 | 1300 m | 118 | 112 | 120 | |
| Difference between Max. and Min. | | 5 | 8 | 2 | 1 |

The separator in accordance with the present invention has high uniformity in both a film thickness and a gas-permeability, and accordingly, is superior in stability of quality.

INDUSTRIAL APPLICABILITY

The separator comprised of the multi-layered porous film in accordance with the present invention has small lot-based fluctuation in quality, and makes it possible to fabricate a battery having a small fluctuation in quality, and accordingly, is industrially promising.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of both PCT/JP2014/077429 filed on Oct. 15, 2014, and Japanese Patent Application No. 2015-083588 filed on Apr. 15, 2015 each including specification, claims, drawings and summary is incorporated herein by reference in its entirety.

The invention claimed is:

1. A method of fabricating a multi-layered porous film including: a base film and a functional layer containing therein both an inorganic filler and a binder resin, the functional layer being formed on a surface of the base film, the multi-layered porous film having a length equal to or greater than 200 meters, wherein a difference between a maximum basis weight and a minimum basis weight of the multi-layered porous film in a length-wise direction thereof is equal to or smaller than 2 grams/m$^2$, the basis weight being measured every 100 meters interval, the method comprising:

immersing a gravure roll having protrusions and recesses formed on a surface thereof, into a coating liquid containing therein inorganic fillers and binder resins to thereby retain the coating liquid in the recesses formed on a surface of the gravure roll, and causing the gravure roll to make contact with a continuously fed base film to thereby coat the coating liquid retained in the recesses, onto a surface of the base film, thereby forming a functional layer containing inorganic fillers and binder resins, on a surface of the base film, the gravure roll employed for gravure coating comprising a roll body composed of a metal, a plurality of protrusions being formed on an outer surface of the roll body, and each obliquely extending at a predetermined angle relative to a central axis of the roll body, a plurality of recesses each being formed between the adjacent obliquely extending protrusions and each retaining the coating liquid therein, the roll body being entirely covered on an outer surface thereof with a diamond like carbon (DLC) layer, each of the obliquely extending protrusions having a trapezoidal cross-section a head of which is cut down and which has a width gradually reducing towards the head, wherein each of the recesses has a trapezoidal cross-section, wherein the DLC layer is water-repellent.

2. The method as set forth in claim 1, wherein a distance between upper portions of the obliquely extending protrusions situated adjacent to each other is in a range of 100 micrometers to 500 micrometers inclusive.

3. The method as set forth in claim 1, wherein a height of each of the obliquely extending recesses is in a range of 100 micrometers to 300 micrometers inclusive.

4. The method as set forth in claim 1, wherein a width of the bottom of each of the recesses is in a range of 50 micrometers to 200 micrometers inclusive.

5. The method as set forth in claim 1, wherein the DLC layer has a thickness in a range of 0.1 micrometer to 3.0 micrometers inclusive.

6. The method as set forth in claim 1, wherein an intermediate layer is formed between a surface of the roll body and the DLC layer.

7. The method as set forth in claim 6, wherein the intermediate layer is made of hard chromium.

8. The method as set forth in claim 7, wherein the intermediate layer has a thickness in the range of 10 micrometers to 30 micrometers inclusive.

* * * * *